(12) United States Patent
Boualleg et al.

(10) Patent No.: US 10,626,337 B2
(45) Date of Patent: Apr. 21, 2020

(54) METHOD FOR THE HYDROTREATMENT OF DIESEL CUTS USING A CATALYST MADE FROM AN AMORPHOUS MESOPOROUS ALUMINA HAVING HIGH CONNECTIVITY

(71) Applicant: IFP Energies nouvelles, Rueil-Malmaison (FR)

(72) Inventors: Malika Boualleg, Villeurbanne (FR); Elodie Devers, Lyons (FR); Bertrand Guichard, Izeaux (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 239 days.

(21) Appl. No.: 15/318,587

(22) PCT Filed: Jun. 9, 2015

(86) PCT No.: PCT/EP2015/062827
§ 371 (c)(1),
(2) Date: Dec. 13, 2016

(87) PCT Pub. No.: WO2015/189201
PCT Pub. Date: Dec. 17, 2015

(65) Prior Publication Data
US 2017/0137724 A1    May 18, 2017

(30) Foreign Application Priority Data
Jun. 13, 2014  (FR) ...................... 14 55424

(51) Int. Cl.
| | |
|---|---|
| *C10G 45/08* | (2006.01) |
| *B01J 37/06* | (2006.01) |
| *B01J 37/08* | (2006.01) |
| *B01J 21/04* | (2006.01) |
| *B01J 27/19* | (2006.01) |
| *B01J 35/10* | (2006.01) |
| *B01J 37/03* | (2006.01) |
| *B01J 37/20* | (2006.01) |
| *B01J 23/888* | (2006.01) |
| *B01J 35/00* | (2006.01) |
| *B01J 23/00* | (2006.01) |
| *B01J 23/882* | (2006.01) |
| *B01J 27/188* | (2006.01) |
| *B01J 23/883* | (2006.01) |
| *B01J 37/00* | (2006.01) |
| *B01J 37/02* | (2006.01) |
| *B01J 35/02* | (2006.01) |

(52) U.S. Cl.
CPC ............ *C10G 45/08* (2013.01); *B01J 21/04* (2013.01); *B01J 23/002* (2013.01); *B01J 23/882* (2013.01); *B01J 23/883* (2013.01); *B01J 23/888* (2013.01); *B01J 23/8885* (2013.01); *B01J 27/188* (2013.01); *B01J 27/19* (2013.01); *B01J 35/002* (2013.01); *B01J 35/1019* (2013.01); *B01J 35/1038* (2013.01); *B01J 35/1042* (2013.01); *B01J 35/1061* (2013.01); *B01J 35/1066* (2013.01); *B01J 35/1071* (2013.01); *B01J 35/1076* (2013.01); *B01J 37/0009* (2013.01); *B01J 37/0201* (2013.01); *B01J 37/036* (2013.01); *B01J 37/20* (2013.01); *B01J 35/023* (2013.01); *B01J 35/026* (2013.01); *B01J 2523/00* (2013.01); *C10G 2300/1059* (2013.01)

(58) Field of Classification Search
CPC ..... C10G 45/08; B01J 37/0236; B01J 37/038; B01J 37/06; B01J 37/08
See application file for complete search history.

(56) References Cited

U.S. PATENT DOCUMENTS

| | | | | |
|---|---|---|---|---|
| 2,914,461 A | * | 11/1959 | Ciapetta ................. | C10G 47/14 208/111.35 |
| 6,589,908 B1 | * | 7/2003 | Ginestra ................. | B01J 21/04 423/625 |

(Continued)

FOREIGN PATENT DOCUMENTS

| | | |
|---|---|---|
| FR | 2972648 A1 | 9/2012 |
| WO | 00/41811 A1 | 7/2000 |

OTHER PUBLICATIONS

International Search Report corresponding to PCT/EP2015/062827 date of completion—Aug. 4, 2015; dated Dec. 8, 2015.
Hailing Liu et al., "Determination of the connectivity of porous solids from nitrogen sorption measurements—II. Generalisation", Chemical Engineering Science, vol. 47, No. 17-18, Dec. 1, 1992, pp. 4393-4404.

*Primary Examiner* — Randy Boyer
(74) *Attorney, Agent, or Firm* — Millen, White, Zolano and Branigan, P.C.

(57) ABSTRACT

There is described a hydroprocessing process of at least one gas oil cut having a weighted mean temperature (TMP) between 240° C. and 350° C. using a catalyst comprising at least one metal of the group VIB and/or at least one metal of the group VIII of the periodic classification and a support comprising an amorphous mesoporous alumina having a connectivity (Z) greater than 2.7, the hydroprocessing process operating at a temperature between 250° C. and 400° C., at a total pressure between 2 MPa and 10 MPa with a ratio of hydrogen volume to volume of hydrocarbon-containing feedstock between 100 and 800 litres per litre and at an Hourly Volume Rate (HVR) which is defined by the ratio of the volume flow rate of liquid hydrocarbon-containing feedstock to volume of catalyst fed into the reactor between 1 and 10 h$^{-1}$.

14 Claims, No Drawings

(56) References Cited

U.S. PATENT DOCUMENTS

| | | | |
|---|---|---|---|
| 7,790,652 B2* | 9/2010 | Ackerman | B01J 21/04 |
| | | | 423/625 |
| 2011/0000824 A1 | 1/2011 | Zhan et al. | |
| 2012/0122659 A1 | 5/2012 | Kuperman et al. | |
| 2014/0076780 A1* | 3/2014 | Guichard | B01J 23/85 |
| | | | 208/111.3 |

* cited by examiner

METHOD FOR THE HYDROTREATMENT OF DIESEL CUTS USING A CATALYST MADE FROM AN AMORPHOUS MESOPOROUS ALUMINA HAVING HIGH CONNECTIVITY

TECHNICAL FIELD

The present invention relates to the field of hydroprocessing operations for hydrocarbon-containing feedstocks of the gas oil type.

It mainly relates to the use of a catalyst based on a specific alumina in methods which allow feedstocks of the gas oil type to be hydroprocessed. In particular, the present invention relates to the use, in a hydroprocessing process, of at least one gas oil cut having a mean weighted temperature (TMP) between 240° C. and 350° C., of a catalyst comprising at least one metal of the group VIB and/or at least one metal of the group VIII of the periodic classification and a support comprising an amorphous mesoporous alumina having very high connectivity and advantageously a specific porous distribution in relation to aluminas of the prior art. The amorphous mesoporous alumina is advantageously shaped from an alumina gel having a high level of dispersibility, the alumina gel itself being obtained by precipitation of at least one aluminium salt according to a specific process.

More specifically, the present invention relates to the use in a hydroprocessing process of the hydrocarbon-containing feedstock of a catalyst comprising a support which comprises an amorphous mesoporous alumina which is shaped from an alumina gel, the alumina gel being prepared in accordance with a preparation process by means of specific precipitation, allowing at least 40% by weight of alumina as equivalent $Al_2O_3$ to be obtained in relation to the total quantity of alumina formed at the end of the precipitation step(s) and more generally at the end of the steps of preparing the alumina gel from the first precipitation step, the quantity of alumina formed at the end of the first precipitation step even being able to reach 100%.

PRIOR ART

The tightening of automotive pollution standards in 2009 within the European Community compels refiners to very greatly reduce the content of sulphur in gas oils and petroleum to a maximum of 10 parts per million by weight (ppm) of sulphur in the gas oils on 1 Jan. 2009, as against 50 ppm on 1 Jan. 2005 (measured by the ASTM D-4294 method). Those constraints involve a need for new refining units or a substantial increase in the iso-volume activity of the hydroprocessing catalysts. Those new constraints will also lead to an increased need in terms of hydrogen in refining, which is necessary for the reactions of hydrodesulphurisation, hydrodenitrogenation and hydrodearomatisation. On the other hand, these new standards are also accompanied by constraints in terms of the quality of the product. In this manner, the gas oils must have a good cetane index. The gas oil hydroprocessing reactions also bring about the hydrogenation of aromatic cores which are contained in the gas oils cuts, which leads to an improvement of the cetane index of the final gas oil cut.

The increase in the levels of effectiveness of the hydroprocessing of the gas oil cuts may partially result from the selection of the process but, in all cases, the use of an intrinsically more active catalytic system is very often a key factor. In this manner, new preparation techniques for hydroprocessing catalysts need to be developed in order to further improve the levels of effectiveness of these catalysts and to comply with future legislation.

Generally, it is admitted that a hydroprocessing catalyst having a high level of catalytic potential is characterised by an optimised hydrogenating function, that is to say, an active phase which is excellently dispersed at the surface of the support and which has a high content of metal. Ideally, whatever the type of hydrocarbon-containing feedstock to be processed, the catalyst must be able to have accessibility for the active locations with regard to the reagents and reaction products whilst developing a high active surface-area, which leads to specific constraints in terms of structure and texture which are peculiar to the oxide support constituting the catalysts.

The composition and use of conventional catalysts for hydroprocessing hydrocarbon-containing feedstocks are clearly described in the publication "Hydrocracking Science and Technology", 1996, J. Scherzer, A. J. Gruia, Marcel Dekker Inc and in the article by B. S. Clausen, H. T. Topsøe, F. E. Massoth, from the publication "Catalysis Science and Technology", 1996, volume 11, Springer-Verlag. In this manner, those catalysts are generally characterised by the presence of an active phase based on at least one metal of the group VIB and/or at least one metal of the group VIII of the periodic table of elements. The most common formulations are of the type cobalt-molybdenum (CoMo), nickel-molybdenum (NiMo) and nickel-tungsten (NiW). Those catalysts may be in mass form or in the supported state, thus making use of a porous solid of a different type. In the last case, the porous support is generally an amorphous oxide or a poorly crystallised oxide, such as, for example, an alumina, or an aluminosilicate, which may or may not be associated with a zeolithic material. After preparation, the metal of the group VIB and/or the metal of the group VIII constituting the catalysts is/are often in the oxide form. Since the active and stable form of the catalysts for hydroprocessing processes is the sulphur-containing form, those catalysts must be subjected to a sulphuration step. This may be carried out in the unit of the associated process, wherein in-situ sulphuration is referred to, or prior to the charging of the catalyst in the unit, wherein ex-situ sulphuration is referred to.

The conventional methods which result in the formation of the active phase of the hydroprocessing catalysts involve a deposit of molecular precursor(s) of at least one metal of the group VIB and/or at least one metal of the group VIII on an oxide support by the so-called "dry impregnation" technique followed by maturation, drying and optionally calcination steps leading to the formation of the form known as the oxidised form of the metal(s) used. There follows the final sulphuration step for generating the active phase as mentioned above.

In particular, the U.S. Pat. No. 7,790,652 describes a new alumina support which has a very specific pore distribution and which can be used as a catalyst support in a hydroconversion process for heavy hydrocarbon-containing feedstocks The support comprising alumina has a mean pore diameter between 100 and 140 A, a size distribution whose extent is less than 33 Å, a pore volume of at least 0.75 ml/g in which less than 5% of the porous volume of the support is present in the pores having a diameter greater than 210 Å.

The support used in conjunction with an active hydrogenating phase allows the acquisition of unexpected catalytic effectiveness levels when it is used in the hydroconversion of heavy feedstocks preferably having a majority of the components thereof boiling at a temperature greater than 343° C. In particular, the process of hydroconversion of heavy feedstocks according to U.S. Pat. No. 7,790,652 allows the achievement of a conversion of hydrocarbon-containing compounds boiling at a temperature greater than 524° C. which is substantially improved in relation to the conversions obtained with conventional catalysts of the prior art. The alumina support is prepared in accordance with a method comprising a first shaping step of an alumina dispersion by mixing, in a controlled manner, a first alkaline aqueous solution and a first acid aqueous solution, at least one of the acid and basic solutions, or both, comprising an aluminium-containing compound. The acid and basic solutions are mixed at such proportions that the pH of the resultant dispersion is between 8 and 11. The acid and basic solutions are also mixed in quantities which allow the acquisition of a dispersion containing the desired quantity of alumina, in particular the first step allows the acquisition of from 25 to 35% by weight of alumina in relation to the total quantity of alumina formed at the end of the two precipitation steps. The first step operates at a temperature between 20 and 40° C. When the desired quantity of alumina is formed, the temperature of the suspension is increased to a temperature between 45 and 70° C., then the heated suspension is subsequently subjected to a second precipitation step by the suspension being placed in contact with a second alkaline aqueous solution and a second acid aqueous solution, at least one of the two solutions or both solutions comprising an aluminium-containing compound. Similarly, the pH is adjusted between 8 and 10.5 by the proportions of the added acid and basic solutions and the remaining quantity of alumina to be formed in the second step is supplied by the quantities of the second acid and basic solutions added. The second step operates at a temperature between 20 and 40° C. The alumina gel formed in this manner comprises at least 95% of boehmite. The dispersibility of the alumina gel obtained in this manner is not mentioned. The alumina gel is subsequently filtered, washed and optionally dried in accordance with the methods known to the person skilled in the art, without any prior thermal processing step, in order to produce an alumina powder which is subsequently shaped in accordance with the methods known to the person skilled in the art, then calcined in order to produce the final alumina support.

The first precipitation step of the preparation process of the U.S. Pat. No. 7,790,652 is limited to low production of alumina, between 25 and 35% by weight, because higher production of alumina at the end of the first step does not allow optimum filtration of the gel obtained. Furthermore, increasing the production of alumina in the first step of the U.S. Pat. No. 7,790,652 would not allow the gel obtained in this manner to be shaped.

Therefore, the applicant has demonstrated that a catalyst comprising at least one metal of the group VIB and/or at least one metal of the group VIII of the periodic classification and a support comprising an amorphous mesoporous alumina having a specific porous distribution and a very high level of connectivity had an improved catalytic activity in relation to conventional catalysts for hydroprocessing gas oils, the catalyst being sulphurated then used in a process for hydroprocessing at least one gas oil cut according to the invention.

In particular, the process according to the invention allows better activity in terms of hydrodesulphurisation, that is to say, an implementation temperature which is lower than the catalysts of the prior art for a given level of sulphur in the effluent.

In practice, the use of the catalyst according to the invention may also allow the refiners to desulphurise a greater proportion of gas oils resulting from the conversion processes (LCO which stands for light cycle oil, coker, etc.).

An object of the present invention is to provide a hydroprocessing process for at least one gas oil cut using a catalyst which has improved catalytic effectiveness levels, in particular in terms of hydrodesulphurisation and hydrodenitrogenation of the cuts processed.

Another object of the present invention is to provide a hydroprocessing process for at least one gas oil cut using a catalyst which has improved catalytic effectiveness levels, the process allowing an increased hydrodesulphurisation activity to be obtained.

SUMMARY AND ADVANTAGE OF THE INVENTION

The present invention relates to a hydroprocessing process for at least one gas oil cut having a mean weighted temperature (TMP) between 240° C. and 350° C., using a catalyst comprising at least one metal of the group VIB and/or at least one metal of the group VIII of the periodic classification and a support comprising an amorphous mesoporous alumina having a connectivity (Z) greater than 2.7, the connectivity being established from the nitrogen adsorption/desorption isotherms, the hydroprocessing process operating at a temperature between 250° C. and 400° C., at a total pressure between 2 MPa and 10 MPa with a ratio of hydrogen volume to volume of hydrocarbon-containing feedstock between 100 and 800 litres per litre and at an Hourly Volume Rate (HVR) which is defined by the ratio of the volume flow rate of liquid hydrocarbon-containing feedstock to volume of catalyst fed into the reactor between 1 and 10 h$^{-1}$.

One of the advantages of the present invention involves the use, in a hydroprocessing process for at least one gas oil cut, of a catalyst based on a support comprising an alumina, the porosity of which is very connected, that is to say, having a number of adjacent pores that is very large. A high connectivity constitutes an important advantage for the diffusion of the molecules of the gas oil cut to be processed when the hydroprocessing process according to the invention is carried out using this material and during the preparation of the catalyst in particular during the impregnation of metal solutions having high concentrations of metals.

Therefore, an advantage of the present invention is to provide a process using a catalyst comprising a specific support which allows the acquisition of an improved activity in terms of hydrodesulphurisation in relation to the catalysts of the prior art.

The invention also relates to a hydroprocessing process for at least one gas oil cut having a mean weighted temperature (TMP) between 240° C. and 350° C., operating at a temperature between 250° C. and 400° C., at a total pressure between 2 MPa and 10 MPa with a ratio of hydrogen volume to volume of hydrocarbon-containing feedstock between 100 and 800 litres per litre and at an Hourly Volume Rate (HVR) which is defined by the ratio of the volume flow rate of liquid hydrocarbon-containing feedstock to volume of catalyst fed into the reactor between 1 and 10 h$^{-1}$, the process using at least one catalyst comprising at least one metal of the group VIB and/or at least one metal of the group VIII of the periodic classification and a support comprising an amorphous mesoporous alumina, the alumina being prepared according to at least the following steps:

a) at least a first precipitation step a) of alumina, in an aqueous reaction medium, from at least one basic precursor selected from sodium aluminate, potassium aluminate, ammonia, sodium hydroxide and potassium hydroxide and at least one acid precursor selected from aluminium sulphate, aluminium chloride, aluminium nitrate, sulphuric acid, hydrochloric acid and nitric acid, wherein at least one of the basic or acid precursors comprises aluminium, the relative flow rate of the acid and basic precursors is selected so as to obtain a pH of the reaction medium between 8.5 and 10.5 and the flow rate of the acid and basic precursor(s) containing aluminium is adjusted so as to obtain a progress rate of the first step between 40 and 100%, the progress rate being defined as being the proportion of alumina formed as equivalent $Al_2O_3$ during the precipitation step a) in relation to the total quantity of alumina formed at the end of the precipitation step(s) and more generally at the end of the preparation steps of the alumina gel, the step a) operating at a temperature between 10 and 50° C., and for a time between 2 minutes and 30 minutes, b) a thermal processing step of the suspension obtained at the end of step a), at a temperature between 50 and 200° C. for a time between 30 minutes and 5 hours allowing an alumina gel to be obtained, c) a filtering step of the suspension obtained at the end of the thermal processing step b) followed by at least one washing step of the gel obtained, d) a drying step of the alumina gel obtained at the end of the step c) in order to obtain a powder, e) a shaping step of the powder obtained at the end of the step d) in order to obtain the raw material, f) a thermal processing step of the raw material obtained at the end of the step e) at a temperature between 500 and 1000° C., with or without an air flow containing up to 60% by volume of water.

An advantage of the invention is to provide a new hydroprocessing process using a catalyst whose alumina support is prepared in accordance with a preparation process which is very specific, allowing shaping of a very dispersible alumina gel, which is itself prepared from a precipitation step in which at least 40% by weight of alumina as an equivalent $Al_2O_3$ in relation to the total quantity of alumina formed at the end of the preparation process of the gel, is formed during the first precipitation step. This process is carried out by carrying out a thermal processing step and in particular a maturation step which allows the acquisition of an alumina gel which has improved filterability and which facilitates the shaping thereof.

DEFINITIONS AND MEASUREMENT METHODS

In the remainder of the text, the dispersibility index is defined as being the percentage by weight of peptised alumina gel which it is possible to disperse by centrifuging in a polypropylene tube at 3600 G for 10 minutes.

The dispersibility is measured by dispersing 10% of boehmite or alumina gel in a suspension of water which also contains 10% of nitric acid in relation to the mass of boehmite. Subsequently, the suspension is centrifuged at 3600 G rpm for 10 minutes. The sediments collected are dried at 100° C. for one night and then weighed.

The dispersibility index designated ID is obtained by the following calculation: ID (%)=100%−mass of dried sediments (%).

In the remainder of the text, the connectivity of the alumina used as a catalyst support or the catalyst used in the process according to the invention is defined as being the number of pores adjacent to a given pore. The connectivity according to the invention is determined from the nitrogen adsorption/desorption isotherms, and is representative of the overall porosity of the alumina or the catalyst and in particular the whole of the mesoporosity of the alumina, that is to say, the whole of the pores having a mean diameter between 2 and 50 nm.

The connectivity is a relative value measured in accordance with the procedure described in the publication by Seaton (Liu H., Zhang L., Seaton N. A., Chemical Engineering Science, 47, 17-18, pp. 4393-4404, 1992). This involves a Monte-Carlo simulation on the basis of the nitrogen adsorption/desorption isotherms. Those connectivity parameters are based on the theory of percolation. The connectivity is connected with the numbers of adjacent pores and a high connectivity represents an advantage for diffusion during catalytic reactions of the molecules to be processed.

The alumina and the catalyst used in the process according to the present invention further have a specific porous distribution, in which the macroporous and mesoporous volumes are measured by intrusion of mercury and the microporous volume is measured by nitrogen adsorption.

The term "macropores" is intended to be understood to be pores whose opening is greater than 50 nm.

The term "mesopores" is intended to be understood to be pores whose opening is between 2 nm and 50 nm, with the limit values being included.

The term "micropores" is intended to be understood to be pores whose opening is less than 2 nm.

In the following description of the invention, the porous distribution measured by mercury porosimetry is determined by intrusion in the mercury porosimeter in accordance with the standard ASTM D4284-83 at a maximum pressure of 4000 bar (400 MPa), using a surface tension of 484 dyne/cm and a contact angle of 140°. The wetting angle has been taken to be 140° in accordance with the recommendations of the publication "Techniques de l'ingénieur, traité analyse et caractérisation" (Engineer techniques, analysis treatise and characterisation), P 1050-5, written by Jean Charpin and Bernard Rasneur.

There is fixed at 0.2 MPa the value from which mercury fills all the intergranular voids and it is considered that beyond this the mercury is introduced into the pores of the alumina.

In order to obtain better precision, the value of the total porous volume corresponds to the value of the total porous volume measured by intrusion in the mercury porosimeter measured on the sample minus the value of the total porous volume measured by intrusion in the mercury porosimeter measured on the same sample for a pressure corresponding to 30 psi (approximately 0.2 MPa).

The macroporous volume of the catalyst is defined as being the cumulative volume of mercury introduced at a pressure between 0.2 MPa and 30 MPa, corresponding to the volume contained in the pores having an apparent diameter greater than 50 nm.

The mesoporous volume of the catalyst is defined as being the cumulative volume of mercury introduced at a pressure between 30 MPa and 400 MPa, corresponding to the volume contained in the pores having an apparent diameter between 2 and 50 nm.

The volume of the micropores is measured by nitrogen porosimetry. The quantitative analysis of the microporosity is carried out on the basis of the method "t" (Lippens-De Boer method, 1965) which corresponds to a transformation of the initial adsorption isotherm as described in the publication "Adsorption by powders and porous solids. Principles, methodology and applications" written by F. Rouquérol, J. Rouquérol and K. Sing, Academic Press, 1999.

The median diameter of the mesopores (Dp in nm) is also defined as being such a diameter that all the pores having a size smaller than that diameter constitute 50% of the mesoporous volume measured by mercury porosimetry.

The porous distribution measured by nitrogen adsorption has been determined by the Barrett-Joyner-Halenda (BJH) model. The nitrogen adsorption/desorption isotherm according to the BJH model is described in the periodical "The Journal of American Society", 73, 373, (1951) written by E. P. Barrett, L. G. Joyner and P. P. Halenda. In the following description of the invention, the term nitrogen adsorption volume is intended to be understood to be the volume measured for $P/P_0=0.99$, for which pressure it is admitted that nitrogen has filled all the pores.

In the following description of the invention, the term specific surface-area is intended to be understood to be the specific surface-area B.E.T. determined by nitrogen adsorption in accordance with the standard ASTM D 3663-78 drawn up on the basis of the BRUNAUER-EMMETT-TELLER method described in the periodical "The Journal of American Society", 60, 309, (1938).

Hereinafter, the groups of chemical elements are given in accordance with the CAS classification (CRC Handbook of Chemistry and Physics, editor CRC press, editor in chief D. R. Lide, 81st edition, 2000-2001). For example, the group VIII in accordance with the CAS classification corresponds to the metals of the columns 8, 9 and 10 in accordance with the new IUPAC classification.

DESCRIPTION OF THE INVENTION

The invention relates to a hydroprocessing process and in particular hydrodesulphurisation process for at least one gas oil cut having a mean weighted temperature (TMP) between 240° C. and 350° C.

The TMP is defined on the basis of the temperature at which 5%, 50% and 70% of the volume of the feedstock are distilled in accordance with the following formula: TMP=(T 5%+2×T 50%+4×T 70%)/7. The TMP is calculated on the basis of simulated distillation values. The hydrocarbon-containing feedstock processed generally has a distillation range between 150° C. and 500° C., preferably between 180 and 450° C.

In the remainder of the text, that feedstock will conventionally be called gas oil but this designation does not have any restrictive character. Any hydrocarbon-containing feedstock containing sulphur and nitrogen-containing compounds which inhibit the hydroprocessing and a TMP similar to that of a gas oil cut may be involved in the process to which the present invention relates. The hydrocarbon-containing feedstock may be of any chemical nature, that is to say, may have any distribution between the different chemical families, in particular paraffins, olefins, naphthenes and aromatics.

Feedstocks

The feedstock used in the hydroprocessing process according to the invention is a gas oil cut containing sulphur.

The sulphur content in the feedstock is generally less than 5% by weight, in a preferred manner between 0.2 and 4% by weight and, in a further preferred manner, between 0.25 and 3% by weight.

The total nitrogen content (neutral and basic) in the feedstock is greater than or equal to 50 ppm, preferably it is between 200 and 6000 ppm by weight, in a more preferable manner between 300 and 4000 ppm by weight and in a still more preferred manner between 400 and 4000 ppm. The basic nitrogen content has at least one third of the total nitrogen content.

The basic nitrogen content is generally greater than or equal to 10 ppm, in a more preferred manner between 65 and 2000 ppm by weight and in a still more preferred manner between 100 and 2000 ppm.

The feedstock processed generally contains very few resins and the content of resins is generally less than 1% by weight.

The gas oil cuts used in the process according to the invention are advantageously selected from the gas oil cuts resulting from the direct distillation (or straight run gas oil) alone or in admixture with at least one cut resulting from a coking unit, or at least one cut resulting from catalytic cracking (Fluid Catalytic Cracking) or at least one gas oil cut resulting from other conversion processes, such as mild hydrocracking or hydroprocessing of the residues. The gas oil cuts used in the process according to the invention are cuts of which at least 90% of the compounds advantageously have a boiling temperature between 250° C. and 400° C.

According to the invention, the hydroprocessing process or hydrodesulphurisation process of at least one gas oil cut according to the invention is carried out at a temperature between 250° C. and 400° C., preferably between 320° C. and 380° C. at a total pressure between 2 MPa and 10 MPa and preferably between 3 MPa and 9 MPa with a ratio of hydrogen volume to hydrocarbon-containing feedstock volume between 100 and 800 litres per litre and preferably between 200 and 400 litres per litre and at an Hourly Volume Rate (HVR) which is defined by the ratio of the volume flow rate of liquid hydrocarbon-containing feedstock to volume of catalyst fed into the reactor between 1 and 10 $h^{-1}$, and preferably between 2 and 8 $h^{-1}$.

According to the invention, the catalyst used in the hydroprocessing process or hydrodesulphurisation process comprises at least one metal of the group VIB and/or at least one metal of the group VIII of the periodic classification and a support comprising and preferably constituted by an amorphous mesoporous alumina having a connectivity (Z) greater than 2.7, the connectivity of the alumina being established from the nitrogen adsorption/desorption isotherms.

The catalyst used in the present invention also has a connectivity (Z), determined from the nitrogen adsorption/desorption isotherms, advantageously greater than 2.7 and preferably between 2.7 and 10, in a preferable manner between 2.8 and 10, in a very preferred manner between 3 and 9, in a more preferred manner between 3 and 8 in a still more preferred manner between 3 and 7, the connectivity of the catalyst being determined from the nitrogen adsorption/desorption isotherms.

Preferably, the elements of the group VIII are selected from the noble metals and the non-noble metals of the group VIII and preferably from iron, cobalt, nickel, ruthenium, rhodium, palladium, osmium, iridium or platinum, taken alone or in admixture.

When the elements of the group VIII are selected from the non-noble metals of the group VIII, the elements of the group VIII are advantageously selected from cobalt, nickel, iron, and preferably from cobalt and nickel, taken alone or in admixture.

Preferably, the elements of the group VIB are selected from tungsten and molybdenum, taken alone or in admixture. When the hydrogenating function comprises an element of the group VIII and an element of the group VIB, the following metal associations are preferred: nickel-molybdenum, cobalt-molybdenum, iron-molybdenum, iron-tungsten, nickel-tungsten, cobalt-tungsten, and in a very preferred manner: nickel-molybdenum cobalt-molybdenum, nickel-tungsten. It is also possible to use associations of three metals, such as, for example, nickel-cobalt-molybdenum. When a combination of metals of the group VI and the group VIII is used, the catalyst is then preferably used in a sulphurated form.

The following metal contents are expressed in their oxide equivalent form when the metering would be carried out by means of X ray fluorescence on the solid which would have been calcined, although the catalyst may or may not be calcined before sulphuration.

When the catalyst comprises at least one metal of the group VIB in combination with at least one non-noble metal of the group VIII, the metal content of the group VIB is advantageously between 10 and 35% by weight of oxide relative to the total mass of the catalyst, preferably between 15 and 30% by weight of oxide and in a very preferred manner between 18 and 25% by weight of oxide and the non-noble metal content of the group VIII is advantageously between 1 and 10% by weight of oxide relative to the total mass of the catalyst, preferably between 1.5 and 8% by weight of oxide and in a very preferred manner between 2 and 6% by weight of oxide.

The molar ratio of the metal(s) of the group VIII compared with the metal(s) of the group VIB in the oxide catalyst is preferably between 0.1:1.0 and 0.8:1.0, in a very preferred manner between 0.2:1.0 and 0.6:1.0, and in an even more preferred manner between 0.3:1.0 and 0.5:1.0.

Advantageously, the catalyst used in the process according to the invention may contain at least one doping element selected from phosphorus, boron, fluorine or silicon, alone or in admixture. Preferably, the doping agent is phosphorus or boron.

When the catalyst contains phosphorus, the content of phosphorus in the oxide catalyst is preferably between 0.5 and 15% by weight of $P_2O_5$, in a more preferred manner between 1 and 10% by weight of $P_2O_5$, in a very preferred manner between 2 and 8% by weight of $P_2O_5$. The content of phosphorus is also advantageously selected so that the molar ratio of phosphorus to molybdenum is between 0.1:1.0 and 0.8:1.0 and in a very preferred manner between 0.2:1.0 and 0.6:1.0.

When the catalyst contains boron, the content of boron in the oxide catalyst is preferably between 0.2 and 8% by weight of $B_2O_3$, more preferably between 0.5 and 5% by weight of $B_2O_3$, in a very preferred manner between 1 and 4% by weight of $B_2O_3$. The boron content is also advantageously selected so that the molar ratio of boron to molybdenum is between 0.1:1.0 and 0.8:1.0 and in a very preferred manner between 0.2:1.0 and 0.6:1.0.

When the catalyst contains silicon, the content of silicon in the oxide catalyst is preferably between 0.5 and 30% by weight of $SiO_2$, more preferably between 3 and 10% by weight of $SiO_2$.

When the catalyst contains fluorine, the content of fluorine in the oxide catalyst is preferably between 0.5 and 5% by weight, more preferably between 1 and 3% by weight.

Preferably, the catalyst used in the process according to the invention comprises a support which comprises and is preferably constituted by an amorphous mesoporous alumina, the alumina being prepared according to the invention.

Preferably, the support of the catalyst used in the present invention comprises and is preferably constituted by an amorphous mesoporous alumina which has a connectivity (Z) between 2.7 and 10, preferably between 2.8 and 10, in a very preferred manner between 3 and 9, more preferably between 3 and 8 and in an even more preferred manner between 3 and 7.

The alumina used as a support in the catalyst used according to the present invention is a mesoporous alumina with controlled mesoporosity which has good thermal and chemical stability, having a size distribution of the mesopores which is centred, uniform and controlled. The alumina and the support comprising the alumina have a specific surface-area and a porous distribution which are calibrated and adapted to the use thereof in a hydroprocessing process of at least one gas oil cut.

The alumina used as a support in the catalyst used in the process according to the present invention and the support of the catalyst advantageously have a specific porous distribution.

Preferably, the mesoporous alumina does not have any micropores.

Preferably, the mesoporous support comprising the alumina does not have any micropores.

Preferably, the alumina and the support comprising the alumina have the following porous distribution, measured by means of mercury porosimetry:
the volume percentage in the pores having a size between 2 and 6 nm, relative to the total porous volume, is between 1 and 25%,
the volume percentage in the pores having sizes greater than 6 nm and less than 15 nm represents between 60 and 95% of the total porous volume,
the volume percentage in the pores having sizes between 15 and 50 nm represents from 0 to 8% of the total porous volume and
the volume percentage in the pores having a size between 50 and 7000 nm which corresponds to the macroporous volume represents from 0 to 5%, preferably from 0 to 2% of the total porous volume.

The median diameter of the mesopores (Dp in nm) measured by means of mercury porosimetry of the alumina and the support, determined in terms of volume is advantageously between 7 and 12.5 nm.

Preferably, the total porous volume of the alumina and the support measured by means of mercury porosimetry is between 0.5 and 0.85 ml/g.

Preferably, the volume of the mesopores of the alumina and the support, measured by means of mercury porosimetry, is between 0.5 and 0.8 ml/g, preferably between 0.55 and 0.75 and, in a very preferred manner, between 0.60 and 0.75 ml/g.

Preferably, the volume of the macropores of the alumina and the support, measured by means of mercury porosimetry, is between 0 and 0.04 ml/g, preferably between 0 and 0.02 ml/g.

Preferably, the alumina and the support advantageously have a specific surface-area greater than 180 $m^2/g$, preferably greater than 220 $m^2/g$.

Preferably, the alumina used in the invention and the support comprising the alumina are not mesostructured.

The alumina used as a support of the catalyst used in the process according to the present invention is advantageously prepared in accordance with the preparation process comprising at least the following steps:
a) at least a first precipitation step of alumina, in an aqueous reaction medium, from at least one basic precursor selected from sodium aluminate, potassium aluminate, ammonia, sodium hydroxide and potassium hydroxide and at least one acid precursor selected from aluminium sulphate, aluminium chloride, aluminium nitrate, sulphuric acid, hydrochloric acid and nitric acid, wherein at least one of the basic or acid precursors comprises aluminium, the relative flow rate of the acid and basic precursors is selected so as to obtain a pH of the reaction medium between 8.5 and 10.5 and the flow rate of the acid and basic precursor(s) containing 'aluminium is adjusted so as to obtain a progress rate of the first step between 40 and 100%, the progress rate being defined as being the proportion of alumina formed as equivalent $Al_2O_3$ during the first precipitation step in relation to the total quantity of alumina formed at the end of the precipitation step(s), the first precipitation step operating at a temperature between 10 and 50° C., and for a time between 2 minutes and 30 minutes, b) a thermal processing step of the suspension heated to a temperature between 50 and 200° C. for a time between 30 minutes and 5 hours which allows an alumina gel to be obtained, c) a filtering step of the suspension obtained at the end of the thermal processing step b), followed by at least one washing step of the gel obtained, d) a drying step of the alumina gel obtained at the end of the step c) in order to obtain a powder, e) a shaping step of the powder obtained at the end of the step d) in order to obtain the raw material, f) a thermal processing step of the raw material obtained at the end of the step e) at a temperature between 500 and 1000° C., with or without a flow of air containing up to 60% by volume of water.

Generally, the term "progress rate" of the nth precipitation step is intended to be understood to be the percentage of alumina formed as equivalent $Al_2O_3$ in the nth step, relative to the total quantity of alumina formed following all of the precipitation steps and more generally following the preparation steps of the alumina gel.

If the progress rate of the precipitation step a) is 100%, the precipitation step a) generally enables an alumina suspension to be obtained which has a concentration of $Al_2O_3$ between 20 and 100 g/L, preferably between 20 and 80 g/L, preferably between 20 and 50 g/L.

Precipitation Step a)

The mixture in the aqueous reaction medium of at least one basic precursor and at least one acid precursor requires either that at least the basic precursor or the acid precursor comprise aluminium, or that both the basic and acid precursors comprise aluminium.

The basic precursors which comprise aluminium are sodium aluminate and potassium aluminate. The preferred basic precursor is sodium aluminate.

The acid precursors which comprise aluminium are aluminium sulphate, aluminium chloride and aluminium nitrate. The preferred acid precursor is aluminium sulphate.

Preferably, the basic and acid precursor(s) is/are added in the first precipitation step a) in an aqueous solution which contains the precursor(s).

Preferably, the basic and acid precursor(s) is/are added in the first precipitation step a) in aqueous solutions.

Preferably, the aqueous reaction medium is water.

Preferably, the step a) is carried out under agitation.

Preferably, the step a) is carried out without any organic additive.

The acid and basic precursors, whether or not they contain aluminium, are mixed, preferably in a solution, in the aqueous reaction medium, in proportions such that the pH of the resultant suspension is between 8.5 and 10.5.

In accordance with the invention, it is the relative flow rate of the acid and basic precursors, whether or not they contain aluminium, which is selected so as to obtain a pH of the reaction medium between 8.5 and 10.5.

In the preferred case in which the acid and basic precursors are sodium aluminate and aluminium sulphate, respectively, the mass ratio of the basic precursor to the acid precursor is advantageously between 1.6 and 2.05.

For the other acid and basic precursors, whether or not they contain aluminium, the basic/acid mass ratios are established by means of a line for neutralisation of the base by the acid. Such a line is readily obtained by the person skilled in the art.

Preferably, the precipitation step a) is carried out at a pH between 8.5 and 10 and in a very preferred manner between 8.7 and 9.9.

The acid and basic precursors are also mixed in quantities which allow a suspension to be obtained which contains the desired quantity of alumina, in accordance with the final concentration of alumina to be achieved. In particular, the step a) allows from 40 to 100% by weight of alumina to be obtained as equivalent $Al_2O_3$ relative to the total quantity of alumina formed at the end of the precipitation step(s) and more generally at the end of the preparation steps of the alumina gel.

In accordance with the invention, it is the flow rate of the acid and basic precursors containing aluminium which is adjusted in order to obtain a progress rate of the first step between 40 and 100%.

Preferably, the progress rate of the precipitation step a) is between 40 and 99%, preferably between 45 and 90% and preferably from 50 to 85%.

If the progress rate obtained at the end of the precipitation step a) is less than 100%, a second precipitation step is required in order to increase the quantity of alumina formed. In this case, the progress rate being defined as being the proportion of alumina formed as equivalent $Al_2O_3$ during the precipitation step a) relative to the total quantity of alumina formed at the end of the two precipitation steps of the preparation process according to the invention and more generally at the end of the preparation steps of the alumina gel.

In this manner, in accordance with the concentration of alumina intended at the end of the precipitation step(s), preferably between 20 and 100 g/l, the quantities of aluminium which have to be added by the acid and/or basic precursors are calculated and the flow rate of the precursors is adjusted in accordance with the concentration of the aluminium precursors added, the quantity of water added to the reaction medium and the progress rate required for the precipitation step(s).

The flow rates of the acid and/or basic precursors which contain aluminium are dependent on the size of the reactor used and thus the quantity of water added to the reaction medium.

Preferably, the precipitation step a) is carried out at a temperature between 10 and 45° C., preferably between 15 and 45° C., more preferably between 20 and 45° C. and in a very preferred manner between 20 and 40° C.

It is important that the precipitation step a) is carried out at a low temperature. If the preparation process according to the invention comprises two precipitation steps, the precipitation step a) is advantageously carried out at a temperature lower than the temperature of the second precipitation step.

Preferably, the precipitation step a) is carried out for a time between 5 and 20 minutes, and preferably from 5 to 15 minutes.

Thermal Processing Step b)

In accordance with the invention, the preparation process comprises a thermal processing step b) of the suspension obtained at the end of the precipitation step a), the thermal processing step operating at a temperature between 60 and 200° C. for a time between 30 minutes and 5 hours, in order to obtain the alumina gel.

Preferably, the thermal processing step b) is a maturation step.

Preferably, the thermal processing step b) operates at a temperature between 65 and 150° C., preferably between 65 and 130° C., preferably between 70 and 110° C., in a very preferred manner between 70 and 95° C.

Preferably, the thermal processing step b) is carried out for a time between 40 minutes and 5 hours, preferably between 40 minutes and 3 hours and preferably between 45 minutes and 2 hours.

Second Optional Precipitation Step

According to a preferred embodiment, when the progress rate obtained at the end of the precipitation step a) is less than 100%, the preparation process preferably comprises a second precipitation step a') after the first precipitation step.

The second precipitation step enables the proportion of alumina produced to be increased. The second precipitation step a') is advantageously carried out between the first precipitation step a) and the thermal processing step b).

When a second precipitation step is carried out, a heating step of the suspension obtained at the end of the precipitation step a) is advantageously carried out between the two precipitation steps a) and a').

Preferably, the heating step of the suspension obtained at the end of the step a), carried out between the step a) and the second precipitation step a'), operates at a temperature between 20 and 90° C., preferably between 30 and 80° C., preferably between 30 and 70° C. and in a very preferred manner between 40 and 65° C.

Preferably, the heating step is carried out for a time between 7 and 45 minutes and preferably between 7 and 35 minutes.

The heating step is advantageously carried out in accordance with all the heating methods known to the person skilled in the art.

According to the preferred embodiment, the preparation process comprises a second precipitation step of the suspension obtained at the end of the heating step, the second step being carried out by means of addition to the suspension of at least one basic precursor selected from sodium aluminate, potassium aluminate, ammonia, sodium hydroxide and potassium hydroxide and at least one acid precursor selected from aluminium sulphate, aluminium chloride, aluminium nitrate, sulphuric acid, hydrochloric acid and nitric acid, in which at least one of the basic or acid precursors comprises aluminium, the relative flow rate of the acid and basic precursors is selected so as to obtain a pH of the reaction medium between 8.5 and 10.5 and the flow rate of the acid and basic precursor(s) containing aluminium is adjusted in order to obtain a progress rate of the second step between 0 and 60%, the progress rate being defined as being the proportion of alumina formed as equivalent $Al_2O_3$ during the second precipitation step relative to the total quantity of alumina formed at the end of the two precipitation steps, more generally at the end of the preparation step of the alumina gel and preferably at the end of the step a') of the preparation process according to the invention, the step operating at a temperature between 40 and 90° C., and for a time between 2 minutes and 50 minutes.

In the same manner as in the first precipitation step a), the addition to the heated suspension of at least one basic precursor and at least one acid precursor requires either that at least the basic precursor or the acid precursor comprise aluminium, or that both the basic and acid precursors comprise aluminium.

The basic precursors which comprise aluminium are sodium aluminate and potassium aluminate. The preferred basic precursor is sodium aluminate.

The acid precursors which comprise aluminium are aluminium sulphate, aluminium chloride and aluminium nitrate. The preferred acid precursor is aluminium sulphate.

Preferably, the basic and acid precursor(s) is/are added in the second precipitation step a') in aqueous solutions.

Preferably, the second precipitation step is carried out under agitation.

Preferably, the second step is carried out without any organic additive.

The acid and basic precursors, whether or not they contain aluminium, are mixed, preferably in solution, in the aqueous reaction medium, in proportions such that the pH of the resultant suspension is between 8.5 and 10.5.

In the same manner as in the precipitation step a), it is the relative flow rate of the acid and basic precursors, whether or not they contain aluminium, which is selected so as to obtain a pH of the reaction medium between 8.5 and 10.5.

In the preferred case in which the acid and basic precursors are sodium aluminate and aluminium sulphate, respectively, the mass ratio of the basic precursor to the acid precursor is advantageously between 1.6 and 2.05.

For the other acid and basic precursors, whether or not they contain aluminium, the basic/acid mass ratios are established by means of a line for neutralisation of the base by the acid. Such a line is readily obtained by the person skilled in the art.

Preferably, the second precipitation step is carried out at a pH between 8.5 and 10 and in a preferred manner between 8.7 and 9.9.

The acid and basic precursors are also mixed in quantities which allow a suspension to be obtained which contains the desired quantity of alumina, in accordance with the final concentration of alumina to be achieved. In particular, the second precipitation step enables from 0 to 60% by weight of alumina to be obtained as equivalent $Al_2O_3$ relative to the total quantity of alumina formed at the end of the two precipitation steps.

In the same manner as in the precipitation step a), it is the flow rate of the acid and basic precursors containing aluminium which is adjusted in order to obtain a progress rate of the second step between 0 and 60%.

Preferably, the progress rate of the precipitation step a) is between 10 and 55% and preferably from 15 to 55%.

In this manner, in accordance with the concentration of alumina intended following the precipitation step(s), preferably between 20 and 100 g/l, the quantities of aluminium which have to be supplied by the acid and/or basic precursors are calculated and the flow rate of the precursors is adjusted in accordance with the concentration of aluminium of the precursors added, the quantity of water added to the reaction medium and the progress rate required for each of the precipitation steps.

In the same manner as in the precipitation step a), the flow rates of the acid and/or basic precursors which contain aluminium are dependent on the size of the reactor used and thus the quantity of water added to the reaction medium.

By way of example, if operating in a reactor of 3 l and if 1 l of alumina suspension having a final concentration of $Al_2O_3$ of 50 g/l is intended, the target progress rate is 50% as equivalent $Al_2O_3$ for the first precipitation step. In this manner, 50% of the total alumina has to be added during the precipitation step a). The precursors of aluminas are sodium aluminate at a concentration of 155 g/l of $Al_2O_3$ and aluminium sulphate at a concentration of 102 g/l of $Al_2O_3$. The pH of precipitation of the first step is fixed at 9.5 and the second at 9. The quantity of water added to the reactor is 622 ml.

For the first precipitation step a) operating at 30° C. for 8 minutes, the flow rate of aluminium sulphate has to be 10.5 ml/min and the flow rate of sodium aluminate is 13.2 ml/min. The mass ratio of sodium aluminate to aluminium sulphate is therefore 1.91.

For the second precipitation step, operating at 70° C., for 30 minutes, the flow rate of aluminium sulphate must be 2.9 ml/min and the flow rate of sodium aluminate is 3.5 ml/min. The mass ratio of sodium aluminate to aluminium sulphate is therefore 1.84.

Preferably, the second precipitation step is carried out at a temperature between 40 and 80° C., preferably between 45 and 70° C. and in a very preferred manner between 50 and 70° C.

Preferably, the second precipitation step is carried out for a time between 5 and 45 minutes, and preferably from 7 to 40 minutes.

The second precipitation step generally enables an alumina suspension to be obtained having a concentration of $Al_2O_3$ between 20 and 100 g/l, preferably between 20 and 80 g/l, preferably between 20 and 50 g/l.

When the second precipitation step is implemented, the preparation process also advantageously comprises a second heating step of the suspension obtained following the second precipitation step to a temperature between 50 and 95° C. and preferably between 60 and 90° C.

Preferably, the second heating step is implemented for a time between 7 and 45 minutes.

The second heating step is advantageously implemented in accordance with all the heating methods known to the person skilled in the art.

The second heating step enables the temperature of the reaction medium to be increased before subjecting the suspension obtained to the thermal processing step b).

Filtering Step c)

According to the invention, the preparation process of alumina according to the invention also comprises a filtering step c) of the suspension obtained at the end of the thermal processing step b), followed by at least one washing step of the gel obtained. The filtering step is carried out in accordance with the methods known to the person skilled in the art.

The filterability of the suspension obtained at the end of the precipitation step a) or the two precipitation steps is improved by the presence of the final thermal processing step b) of the suspension obtained, the thermal processing step promoting the productivity of the preparation process and an extrapolation of the process at the industrial level.

The filtering step is advantageously followed by at least one washing step in water and preferably by from one to three washing steps, with a quantity of water which is equal to the quantity of filtered precipitate.

The sequence of the steps a), b) and c) and optionally the second precipitation step, the second heating step and the optional filtering step enables a specific alumina gel to be obtained which has a dispersibility index greater than 70%, a crystallite size of from 1 to 35 nm, and a sulphur content between 0.001% and 2% by weight and a content of sodium between 0.001% and 2% by weight, the percentages by weight being expressed in relation to the total mass of alumina gel.

The alumina gel obtained in this manner, also known as boehmite, has a dispersibility index between 70 and 100%, preferably between 80 and 100%, in a very preferred manner between 85 and 100%, and even more preferably between 90 and 100%.

Preferably, the alumina gel obtained in this manner has a crystallite size of from 2 to 35 nm.

Preferably, the alumina gel obtained in this manner comprises a sulphur content between 0.001% and 1% by weight, preferably between 0.001 and 0.40% by weight, in a very preferred manner between 0.003 and 0.33% by weight, and more preferably still between 0.005 and 0.25% by weight.

Preferably, the alumina gel obtained in this manner comprises a sodium content between 0.001% and 1% by weight, preferably between 0.001 and 0.15% by weight, in a very preferred manner between 0.0015 and 0.10% by weight, and 0.002 and 0.040% by weight.

In particular, the alumina gel or the boehmite in the form of powder according to the invention is composed of crystallites whose size, obtained using the Scherrer formula with diffraction of X rays in the crystallographic directions (020) and (120) are between 2 and 20 nm and between 2 and 35 nm, respectively.

Preferably, the alumina gel according to the invention has a crystallite size in the crystallographic direction (020) of from 2 to 15 nm and a crystallite size in the crystallographic direction (120) of from 2 to 35 nm.

The diffraction of the X rays on the alumina gels or boehmites was carried out using the conventional method of powders using a diffractometer.

The Scherrer formula is a formula which is used in diffraction of X rays on polycrystalline powders or samples and which connects the width at mid-height of the diffraction peaks to the size of the crystallites. It is described in detail in the reference publication: Appl. Cryst. (1978). 11, 102-113 Scherrer after sixty years: A survey and some new results in the determination of crystallite size, J. I. Langford and A. J. C. Wilson.

The alumina gel which is prepared in this manner and which has a high dispersibility level enables the shaping step of the gel to be facilitated in accordance with all methods known to the person skilled in the art and in particular by means of extrusion mixing, by means of granulation and by means of the technique known as oil drop.

Drying Step d)

According to the invention, the alumina gel obtained at the end of the filtering step c) is dried in a drying step d) in order to obtain a powder.

The drying step is advantageously carried out at a temperature between 20 and 50° C. for a time between 1 day and 3 weeks or by means of atomisation.

If the drying step d) is carried out at a temperature between 20 and 50° C. and for a time between 1 day and 3 weeks, the drying step d) can advantageously be carried out in a closed and ventilated oven, preferably the drying step is carried out at a temperature between 25 and 40° C., and for a time between 3 days and two weeks.

When the drying step d) is carried out by means of atomisation, the cake obtained following the thermal processing step optionally followed by a filtering step is returned to suspension. The suspension is then sprayed in fine droplets, in a vertical cylindrical chamber in contact with a current of hot air in order to evaporate the water in accordance with the principle which is well known to the person skilled in the art. The powder obtained is carried by the flow of heat as far as a cyclone or a sleeve type filter which will separate the air from the powder. Preferably, when the drying step d) is carried out by means of atomisation, the atomisation is carried out in accordance with the operating protocol described in the publication Asep Bayu Dani Nandiyanto, Kikuo Okuyama, Advanced Powder Technology, 22, 1-19, 2011.

Shaping Step e)

According to the invention, the powder obtained at the end of the drying step d) is shaped in a step e) in order to obtain a raw material.

The term raw material is intended to be understood to be the material which has been shaped and which has not been subjected to thermal processing steps.

Preferably, the shaping step e) is carried out by means of extrusion mixing, by means of pelleting, by means of the oil-drop method, by means of granulation with a rotating plate or by any other method well known to the person skilled in the art.

In a very preferred manner, the shaping step e) is carried out by means of extrusion mixing.

Thermal Processing Step f)

According to the invention, the raw material obtained at the end of the shaping step e) is subsequently subjected to a thermal processing step f) at a temperature between 500 and 1000° C., for a time between 2 and 10 h, with or without an air flow containing up to 60% by volume of water.

Preferably, the thermal processing step f) operates at a temperature between 540° C. and 850° C.

Preferably, the thermal processing step f) operates for a time between 2 h and 10 h.

The thermal processing step f) allows the transition from boehmite to the final alumina.

The preparation process for the alumina used as the support for the catalyst used in the process according to the invention allows the acquisition of an amorphous mesoporous alumina having a connectivity greater than 2.7 and a controlled mesoporosity, the alumina having a good thermal and chemical stability, having a size distribution of the mesopores which is centered, uniform and controlled, and a specific surface-area and a porous and in particular mesoporous volume which are calibrated, and has the specific porous distribution as described below.

The catalyst used in the hydroprocessing process according to the invention is subsequently advantageously obtained by addition of the elements constituting the active phase.

The catalyst according to the invention can be prepared by means of any technique known to the person skilled in the art, and in particular by impregnation of the elements of the groups VIII and/or VIB on the support selected. The addition of doping agent such as phosphorus can be carried out at the same time as the addition of the metal salts. That impregnation may, for example, be carried out according to the method known to the person skilled in the art by the term dry impregnation, in which only the quantity of elements desired is introduced in the form of soluble salts in the solvent selected, for example, demineralised water, so as to fill the porosity of the support as precisely as possible. The impregnation can also be carried out to excess if the person skilled in the art considers it necessary. The support filled in this manner by the solution according to one or other of the methods mentioned above is preferably dried. That step is preferably preceded by a maturation step, the duration of which is less than 72 hours and preferably between 0 and 24 hours, in a very preferred manner between 1 and 12 hours.

The drying step which follows is preferably carried out under air or under an inert gas at a temperature between 50 and 200° C., very preferably between 65 and 180° C. and in an even more preferred manner between 75 and 160° C. The drying step is optionally followed by a calcination step, generally between 200° C. and 550° C., preferably between 300° C. and 500° C. The calcination is then carried out in the presence of air or an inert gas.

In some cases, it may be advantageous to carry out the impregnation in at least two steps. When this solution is preferred, intermediate maturation and drying, or calcination, steps remain possible.

The precursors of the metal(s) of group VIII are advantageously selected from oxides, citrates, oxalates, carbonates, hydroxycarbonates, hydroxides, phosphates, sulphates, aluminates, molybdates, tungstates, nitrates, halogenides, for example, chlorides, fluorides, bromides, acetates, or any admixture of the compounds set out here. Nickel hydroxycarbonate, cobalt or nickel nitrate, cobalt carbonate or cobalt or nickel hydroxide are used in a preferred manner.

The molybdenum precursors used are well known to the person skilled in the art. For example, among the sources of molybdenum, it is possible to use the oxides and hydroxides, molybdic acids and the salts thereof, in particular the ammonium salts such as ammonium molybdate, ammonium heptamolybdate, phosphomolybdic acid ($H_3PMo_{12}O_{40}$) and the salts thereof, and optionally silicomolybdic acid ($H_4SiMo_{12}O_{40}$) and the corresponding salts. The sources of molybdenum may also be any heteropoly compound of the type Keggin, lacunary Keggin, substituted Keggin, Dawson, Anderson, Strandberg, for example. There is preferably used molybdenum trioxide and the heteropoly anions of the type Strandberg, Keggin, lacunary Keggin or substituted Keggin known to the person skilled in the art. The precursors of tungsten used are well known to the person skilled in the art. For example, among the sources of tungsten, it is possible to use the oxides and hydroxides, the tungstic acids and the salts thereof, in particular the ammonium salts, such as ammonium tungstate, ammonium metatungstate, phosphotungstic acid ($H_3PWo_{12}O_{40}$) and the salts thereof, and optionally silicotungstic acid ($H_4SiW_{12}O_{40}$) and the salts thereof. The sources of tungsten may also be any heteropolycompound of the type Keggin, lacunary Keggin, substituted Keggin, Dawson, for example. There are preferably used the ammonium oxides and salts such as ammonium metatungstate or the heteropolyanions of the type Keggin, lacunary Keggin or substituted Keggin which are known to the person skilled in the art.

A chelating agent of an organic type may advantageously be introduced into the metal solution(s) which are used if the person skilled in the art considers it necessary.

Whether or not the catalyst is subjected to a calcination step, it may subsequently be impregnated by one or more organic agents, taken alone or in admixture in a solvent of an organic type or aqueous type. In that case, the person skilled in the art may refer to the abundant literature which exists.

The catalyst obtained and used in this manner in the process according to the present invention advantageously has the following porous distribution which is determined by mercury porosimetry:

the volume percentage contained in the pores having a size between 2 and 6 nm, in relation to the total porous volume is between 1 and 25%, the volume percentage contained in the pores having sizes greater than 6 nm and less than 15 nm constitutes between 60 and 95% of the total porous volume, the volume percentage contained in the pores having a size between 15 and 50 nm constitutes from 0 to 15% of the total porous volume and the volume percentage contained in the pores having a size between 50 and 7000 nm which corresponds to the macroporous volume constitutes from 0 to 5% of the total porous volume and is preferably between 0 and 3%.

Finally, the median diameter of the mesopores of the catalyst established by volume (Dp in nm) measured by mercury porosimetry is advantageously between 8 and 14 nm.

The catalyst also advantageously has a specific surface-area greater than 130 m$^2$/g, preferably greater than 150 m$^2$/g.

Preferably, the catalyst also has a total porous volume measured by mercury porosimetry greater than or equal to 0.35 ml/g, preferably greater than or equal to 0.40 ml/g.

Preferably, the catalyst used in the present invention has a connectivity (Z) between 2.7 and 10, in a preferred manner between 2.8 and 10, in a very preferred manner between 3 and 9, in a more preferred manner between 3 and 8 and in a still more preferred manner between 3 and 7.

The preparation process of the catalyst according to the invention advantageously comprises at least one sulphuration step so that the active phase of the catalyst is in the sulphide form in order to use the catalyst in a hydroprocessing process as described in the present description. That processing of activation by sulphuration is well known to the person skilled in the art and may be carried out by any method known to the person skilled in the art. The sulphuration step is carried out by placing the catalyst used in the process according to the invention in contact with at least one decomposable sulphur-containing organic compound which generates H$_2$S or by placing the catalyst in direct contact with a gaseous flow of H$_2$S, for example, diluted in hydrogen. The sulphur-containing organic compound is advantageously selected from alkyl disulphides such as dimethyl disulphide (DMDS), alkyl sulphides such as dimethyl sulphide, mercaptans such as n-butylmercaptan, polysulphide compounds of the type tertiononyl polysulphide such as TPS-37 or TPS-54 which are marketed by the company ARKEMA, or any other compound which is known to the person skilled in the art and which allows the acquisition of good sulphuration of the catalyst. The sulphuration step may be carried out in situ (that is to say, after charging the catalyst in the reaction unit of the hydroprocessing process according to the invention) or ex situ (that is to say, before charging the catalyst in the reaction unit of the hydroprocessing process according to the invention) at a temperature between 200 and 600° C. and more preferably between 300 and 500° C. When the sulphuration is carried out in an ex situ manner, it is possible to introduce an organic additive or a solvent or any admixture thereof. That alternative may either result in better activity or facilitate the charging and the use of the catalyst.

The invention is illustrated by the following examples which do not have in any case limiting character.

EXAMPLES

Example 1 (Comparative): Preparation of a Support AL-1 (Non-Conforming) in Accordance with the U.S. Pat. No. 7,790,562

There is initially carried out the synthesis of a non-conforming alumina gel in that Example 1 is carried out according to the preparation process described in the U.S. Pat. No. 7,790,562. In particular, the preparation process of the alumina gel according to Example 1 does not comprise any thermal processing step of the suspension obtained at the end of the precipitation steps and in that the first precipitation step a) does not produce a quantity of alumina greater than 40% as equivalent Al$_2$O$_3$ in relation to the total quantity of alumina formed at the end of the second precipitation step.

The synthesis is carried out in a 7 L reactor and a final suspension of 5 L in 2 precipitation steps. The quantity of water added to the reactor is 3868 ml.

The intended final concentration of alumina is 30 g/L.

A first co-precipitation step of aluminium sulphate Al$_2$(SO$_4$) and sodium aluminate NaAlOO is carried out at 30° C. and pH=9.3 for a time of 8 minutes. The concentrations of the aluminium precursors used are as follows: Al$_2$(SO$_4$)= at 102 g/L of Al$_2$O$_3$ and NaAlOO at 155 g/L of Al$_2$O$_3$. The agitation is at 350 rpm over the whole of the synthesis.

A solution of aluminium sulphate Al$_2$(SO$_4$) is added continuously for 8 minutes at a rate of 19.6 ml/min to a solution of sodium aluminate NaAlOO according to a base/acid mass ratio=1.80 so as to adjust the pH to a value of 9.3. The temperature of the reaction medium is maintained at 30° C.

A suspension containing a precipitate of alumina is obtained.

Since the intended final concentration of alumina is 30 g/L, the rate of the precursors aluminium sulphate Al$_2$(SO$_4$) and sodium aluminate NaAlOO containing aluminium introduced in the first precipitation step are 19.6 ml/min and 23.3 ml/min, respectively.

Those rates of acid and basic precursors containing aluminium allow the acquisition, at the end of the first precipitation step, of a progress rate of 30%.

The suspension obtained is subsequently subjected to a temperature increase of from 30 to 57° C.

A second co-precipitation step of the suspension obtained is subsequently carried out by the addition of aluminium sulphate Al$_2$(SO$_4$) to a concentration of 102 g/L of Al$_2$O$_3$ and sodium aluminate NaAlOO at a concentration of 155 g/L of Al$_2$O$_3$. A solution of aluminium sulphate Al$_2$(SO$_4$) is therefore added continuously to the heated suspension obtained at the end of the first precipitation step for 30 minutes at a rate of 12.8 ml/min to a solution of sodium aluminate NaAlOO according to a base/acid mass ratio=1.68 so as to adjust the pH to a value of 8.7. The temperature of the reaction medium in the second step is maintained at 57° C.

A suspension containing a precipitate of alumina is obtained.

Since the intended final concentration of alumina is 30 g/L, the rate of the precursors aluminium sulphate Al$_2$(SO$_4$) and sodium aluminate NaAlOO containing aluminium introduced in the second precipitation step are 12.8 ml/min and 14.1 ml/min, respectively.

Those rates of acid and basic precursors containing aluminium allow the acquisition, at the end of the second precipitation step, of a progress rate of 70%.

The suspension obtained in this manner is not subjected to any thermal processing step.

The suspension obtained is subsequently filtered by displacement of water over a sintered Buchner type tool and the alumina gel obtained is washed 3 times with 5 L of distilled water at 70° C. The filtration time and the washing operations are 4 hours long.

The characteristics of the alumina gel obtained in this manner are set out in Table 1.

TABLE 1

Characteristics of the alumina gel obtained in accordance with Example 1.

| | |
|---|---|
| Dispersibility index Ta = 10% (%) | 60 |
| Size (020) (nm) | 2.9 |
| Size (120) (nm) | 4.1 |
| Sodium Na (ppm) | 0.011 |
| Sulphur S (ppm) | 0.057 |
| Filtration time | 4 hours |

The alumina gel is subsequently dried by atomisation with an inlet temperature of 250° C. and outlet temperature of 130° C.

The dried alumina gel is introduced into a mixer of the Brabender type. Water acidified with nitric acid at a total acid rate of 3%, expressed by weight in relation to the mass of dried gel introduced in the mixer, is added within 5 minutes during mixing at 20 rpm. The acidic mixing continues for 15 minutes. A neutralisation step is subsequently carried out by the addition of an ammoniacal solution into the mixer, at a neutralisation rate of 50%, expressed by weight of ammonia in relation to the quantity of nitric acid introduced into the mixer for the acidification step. The mixing continues for 3 minutes.

The paste obtained is subsequently extruded through a three-lobed die of 2 mm. The extrudates obtained are dried at 100° C. for a night then calcined for 2 h at 600° C.

The characteristics of the alumina formed are set out in Table 2:

TABLE 2

Characteristics of the alumina AL-1 obtained according to Example 1.

| | AL-1 |
|---|---|
| $S_{BET}$ (m²/g) | 230 |
| $V_{Des*N2}$ (ml/g) | 0.91 |
| VPT (Hg) (ml/g) | 0.78 |
| Vmacro (Hg) (ml/g) | 0.01 |
| Vméso (Hg) (ml/g) | 0.81 |
| V (d < 6 nm) % | 43 |
| V (6 < d < 15 nm) % | 55 |
| V (15 < d < 50 nm) % | 1 |
| Z | 2.5 |
| Dp (Hg) (nm) | 11.5 |

Example 2 (According to the Invention): Preparation of the Supports AL-2 and AL-3 (Conforming)

There is initially carried out the synthesis of two alumina supports AL-2 and AL-3 according to a preparation process according to the invention in a 7 L reactor and a final suspension of 5 L in 3 steps, two precipitation steps followed by a maturating step.

The intended final concentration of alumina is 45 g/L. The quantity of water added to the reactor is 3267 ml. The agitation is 350 rpm over the whole of the synthesis.

A first co-precipitation step in water, aluminium sulphate $Al_2(SO_4)$ and sodium aluminate NaAlOO is carried out at 30° C. and pH=9.5 for a time of 8 minutes. The concentrations of the aluminium precursors used are as follows: $Al_2(SO_4)$=at 102 g/L of $Al_2O_3$ and NaAlOO at 155 g/L of $Al_2O_3$.

A solution of aluminium sulphate $Al_2(SO_4)$ is added continuously for 8 minutes at a rate of 69.6 ml/min to a solution of sodium aluminate NaAlOO at a rate of 84.5 ml/min according to a base/acid mass ratio=1.84 so as to adjust the pH to a value of 9.5. The temperature of the reaction medium is maintained at 30° C.

A suspension containing a precipitate of alumina is obtained.

Since the intended final concentration of alumina is 45 g/L, the rate of the precursors aluminium sulphate $Al_2(SO_4)$ and sodium aluminate NaAlOO containing aluminium introduced in the first precipitation step is 69.6 ml/min and 84.5 ml/min, respectively.

Those rates of acid and basic precursors containing aluminium allow the acquisition, at the end of the first precipitation step, of a progress rate of 72%.

The suspension obtained is subsequently subjected to a temperature increase from 30 to 68° C.

A second co-precipitation step of the suspension obtained is subsequently carried out by the addition of aluminium sulphate $Al_2(SO_4)$ at a concentration of 102 g/L of $Al_2O_3$ and sodium aluminate NaAlOO at a concentration of 155 g/L of $Al_2O_3$. A solution of aluminium sulphate $Al_2(SO_4)$ is therefore added continuously to the heated suspension obtained at the end of the first precipitation step for 30 minutes at a rate of 7.2 ml/min to a solution of sodium aluminate NaAlOO according to a base/acid mass ratio=1.86 so as to adjust the pH to a value of 9.

The temperature of the reaction medium in the second step is maintained at 68° C.

A suspension containing a precipitate of alumina is obtained.

Since the intended final concentration of alumina is 45 g/L, the rate of the precursors aluminium sulphate $Al_2(SO_4)$ and sodium aluminate NaAlOO containing aluminium introduced in the second precipitation step is 7.2 ml/min and 8.8 ml/min, respectively.

Those rates of acid and basic precursors containing aluminium allow the acquisition at the end of the second precipitation step of a progress rate of 28%.

The suspension obtained is subsequently subjected to a temperature increase from 68 to 90° C.

The suspension is subsequently subjected to a thermal processing step in which it is maintained at 90° C. for 60 minutes.

The suspension obtained is subsequently filtered by displacement of water over a sintered Buchner type tool and the alumina gel obtained is washed 3 times with 5 L of distilled water.

The filtration time and the washing operations are 3 hours long.

The characteristics of the alumina gel obtained in this manner are set out in Table 3.

TABLE 3

Characteristics of the alumina gel obtained in accordance with Example 2.

| | |
|---|---|
| Dispersibility index Ta = 10% (%) | 100 |
| Size (020) (nm) | 2.8 |
| Size (120) (nm) | 3.5 |
| Sodium Na (%) | 0.074 |
| Sulphur S (%) | 0.0364 |
| Filtration time | 3 hours |

A gel having a dispersibility index of 100% is obtained in this manner.

The alumina gel obtained is subsequently dried by atomisation with an inlet temperature of 250° C. and outlet temperature of 130° C. The gel dried by atomisation is called Gel No. 1.

The alumina gel obtained according to Example 2 has also been dried in a ventilated oven at 35° C. for 4 days. The gel dried in the oven is called Gel No. 2.

The dried alumina gels Nos. 1 and 2 are subsequently introduced into a mixer of the Brabender type, respectively. Water acidified with nitric acid at a total acid rate of 3%, expressed by weight in relation to the mass of dried gel introduced into the mixer, is added within 5 minutes, during mixing at 20 rpm. The acidic mixing continues for 15 minutes. A neutralisation step is subsequently carried out by the addition of an ammoniacal solution in the mixer, at a neutralisation rate of 50%, expressed by weight of ammonia in relation to the quantity of nitric acid introduced into the mixer for the acidification step. The mixing continues for 3 minutes.

The paste obtained is subsequently extruded through a three-lobed die of 2 mm. The extrudates obtained are dried at 100° C. for a night then calcined for 2 h at 600° C.

The characteristics of the aluminas AL-2 and AL-3 formed are set out in Table 4:

TABLE 4

Characteristics of the aluminas AL-2 and AL-3 obtained in accordance with Example 2.

|  | AL-2 | AL-3 |
|---|---|---|
| Type of drying | Atomisation | 35° C. |
| $S_{BET}$ (m$^2$/g) | 289 | 292 |
| $V_{Des*N2}$ (ml/g) | 0.83 | 0.84 |
| VPT (Hg) (ml/g) | 0.68 | 0.69 |
| Vmacro (50-7000 nm) (Hg) (ml/g) | 0.01 (2%) | 0.01 (2%) |
| Vmeso (Hg) (ml/g) | 0.71 (99%) | 0.73 (99%) |
| V (d < 6 nm) % | 3 | 2 |
| V (6 < d < 15 nm) % | 82 | 84 |
| V (15 < d < 50 nm) % | 6 | 5 |
| Z | 6.5 | 6 |
| Dp at Vmeso/2 (nm) (Hg) | 9.7 | 9.8 |

Example 3: Preparation of the Catalysts C1 and C2 (Non-Conforming), from the Alumina AL-1 and the Catalysts C3 and C4 (Conforming) from the Alumina Supports AL-2 and AL-3, Respectively The catalysts C1 and C2 are obtained by dry impregnation of the alumina support AL-1 in the form of extrudates, prepared according to Example 1, by an impregnation solution prepared by warm dissolution of molybdenum oxide and cobalt hydroxycarbonate in a solution of phosphoric acid in an aqueous solution, the volume of the impregnation solution being strictly equal to the porous volume of the mass of alumina support. The concentrations of precursors in the impregnation solution are adjusted so as to deposit on the alumina support the contents by weight of Mo, Co and P desired. After the dry impregnation step, the extrudates are left to mature under an atmosphere saturated with water for 12 hours, then they are dried for one night at 90° C. before being calcined at 450° C. for 2 hours.

The final composition of the catalyst C1 expressed in the form of oxides and established by X ray fluorescence is then as follows: $MoO_3$=20.4±0.2 (% by weight), CoO=3.6±0.1 (% by weight) and $P_2O_5$=5.9±0.1 (% by weight), which corresponds to Co/Mo=0.34 mol/mol and P/Mo=0.59 mol/mol.

The final composition of the catalyst C2 expressed in the form of oxides and established by X ray fluorescence is then as follows: $MoO_3$=25.6±0.2 (% by weight), CoO=3.9±0.1 (% by weight) and $P_2O_5$=2.8±0.1 (% by weight), which corresponds to Co/Mo=0.29 mol/mol and P/Mo=0.22 mol/mol.

For the catalysts C1 and C2, the parameter Z remains similar to that of the alumina AL-1 with 2.4 and 2.3, respectively.

The catalyst C3 is prepared in a similar manner to the catalyst C1, but from the support AL-2. It retains a value Z greater than that of the catalyst C1 with 6.4.

The final composition of the catalyst C3 expressed in the form of oxides and established by X ray fluorescence is then as follows: $MoO_3$=20.1±0.2 (% by weight), CoO=3.4±0.1 (% by weight) and $P_2O_5$=6.0±0.1 (% by weight), which corresponds to Co/Mo=0.33 mol/mol and P/Mo=0.60 mol/mol.

The catalyst C4 is prepared in a similar manner to the catalyst C1, but from the support AL-3. It also retains a value Z greater than that of the catalyst C2, with 6.1.

The final composition of the catalyst C4 expressed in the form of oxides is then as follows: $MoO_3$=25.1±0.2 (% by weight), CoO=3.6±0.1 (% by weight) and $P_2O_5$=2.9±0.1 (% by weight), which corresponds to Co/Mo=0.28 mol/mol and P/Mo=0.23 mol/mol.

Example 4: Evaluation of the Catalytic Performance Levels of the Catalysts C1 and C2 (Non-Conforming) and C3 and C4 (Conforming) in a Hydrogenation Model Molecule Test of Toluene in Cyclohexane Under Pressure and in the Presence of $H_2S$ In applications such as hydroprocessing, wherein, in order to reach the sulphur targets in force, it is necessary to desulphurise for the most part refractory compounds such as 4.6 DMDBT, the hydrodehydrogenation function is critical. The hydrogenation test of toluene has therefore been used in order to establish the advantage of catalysts which are intended for hydroprocessing such feedstocks.

The catalysts C1 to C4 described above are sulphurated in situ in a dynamic manner in a fixed-bed tubular reactor, through which a pilot unit of the type Microcat (manufacturer: the company Vinci) passes, the fluids flowing from top to bottom. The measurements of hydrogenising activity are carried out immediately after the sulphuration under pressure and without being placed in air with the feedstock of hydrocarbides which was used to sulphurise the catalysts.

The sulphuration and test feedstock is composed of 5.88% of dimethyl disulphide (DMDS), 20% of toluene and 74.12% of cyclohexane (by weight). The DMDS allows, as a result of decomposition into methane and $H_2S$, the maintenance of the catalyst in the sulphurated form.

The sulphuration is carried out from ambient temperature up to 350° C., with a temperature gradient of 2° C./min, a HVR=4 h$^{-1}$ and $H_2$/HC=450 Nl/l. The catalytic test is carried out at 350° C. at HVR=2 h$^{-1}$ and $H_2$/HC equivalent to that of sulphuration, with analysis on line on at least 4 samples/effluents in order to establish the composition thereof.

Thus, there are measured the stabilised catalytic activities of volumes equal to catalysts in the hydrogenation reaction of the toluene.

The detailed conditions for measuring activity are as follows:

| | |
|---|---|
| Total pressure: | 6.0 MPa |
| Toluene pressure: | 0.37 MPa |
| Cyclohexane pressure: | 1.42 MPa |
| Methane pressure: | 0.22 MPa |
| Hydrogen pressure: | 3.68 MPa |
| H$_2$S pressure: | 0.22 MPa |

There is fed a volume of catalyst equal to 4 cm$^3$ (extrudates having a length between 2 and 4 mm) by weighing via the density of the catalytic bed.

The establishment of the molar concentrations in terms of non-converted toluene (T) and the concentrations in terms of hydrogenation products (methyl cyclohexane (MCC6), ethyl cyclopentane (EtCC5) and dimethyl cyclopentanes (DMCC5)) allow calculation of a rate of hydrogenation of toluene X$_{HYD}$ defined by:

$$X_{HYD}(\%) = 100 \times \frac{MCC6 + EtCC5 + DMCC5}{T + MCC6 + EtCC5 + DMCC5}$$

The hydrogenation reaction of the toluene being in the order of 1 under the test conditions used and the reactor behaving as an ideal piston reactor, the hydrogenating activity AHYD of the catalysts is calculated using the formula:

$$A_{HYD} = \ln\left(\frac{100}{100 - X_{HYD}}\right)$$

Table 5 below allows a comparison of the relative hydrogenating activities of the catalysts C1 to C4 in accordance with the impregnated active phase and the connectivity parameter Z.

TABLE 5

Relative activity in relation to the catalyst C1 (non-conforming) in terms of hydrogenation of the toluene of the catalysts C3 and C4 (conforming) and the catalyst C2 (non-conforming)

| Catalyst | | | | Relative A$_{HYD}$ in relation to C1 (%) |
|---|---|---|---|---|
| C1 (non-conforming) | 20% MoO$_3$ | Z = 2.4 | AL-1 | 100 |
| C3 (conforming) | 20% MoO$_3$ | Z = 6.4 | AL-2 | 122 |
| C2 (non-conforming) | 25% MoO$_3$ | Z = 2.3 | AL-1 | 118 |
| C4 (conforming) | 25% MoO$_3$ | Z = 6.1 | AL-3 | 153 |

The results appearing in Table 5 demonstrate that the catalytic performance levels, in terms of hydrogenating activity, of the catalyst C3 which is prepared according to the invention from the support AL-2 and the parameter Z of which is therefore 6.4 are significantly greater than those of the non-conforming catalyst C1 which was obtained from the support AL-1 and which therefore has a parameter Z of 2.4.

That increase in hydrogenating activity is particularly advantageous because it allows in particular a level of activity to be achieved similar to that of the non-conforming catalyst C2, but with only 20% of MoO$_3$ as against 25% of MoO$_3$ on the catalyst C2. Furthermore, at this content of molybdenum, the catalyst C4 prepared according to the invention from the support AL-3 has a hydrogenating activity which is even higher.

In the absence of diffusion limitation of the reaction feedstock, the test being carried out in the gas phase, this result demonstrates the advantage of the impregnation of the metal phase on a support with high connectivity. The quality of the active phase deposited appears to be improved.

Example 5: Evaluation of the Catalytic Performance Levels of the Catalysts C1 and C2 (Non-Conforming) and the Catalysts C3 and C4 (Conforming) in Terms of Hydroprocessing of Direct Distillation Gas Oil In order to evaluate them in terms of hydrodesulphurisation (HDS) of gas oil, the catalysts C1 to C4 are subjected to a sulphuration step in-situ in a reactor of the flowthrough-bed type (30 cm$^3$ of catalyst in the form of extrudates mixed with 10 cm$^3$ of SiC having a grain size of 0.8 mm). The sulphuration is carried at 30 bar (3 MPa), at HVR=2 h$^{-1}$, with a ratio (of volume flow rate) H$_2$/HC inlet=250 Std l/l. The sulphuration feedstock (gas oil supplemented by 2% of DMDS Evolution® from the company Arkéma) is introduced into the reactor under a flow of H$_2$ when it reaches 150° C. After an hour at 150° C., the temperature is increased at a gradient of 25° C./hour up to 220° C., then at a gradient of 12° C./hour until a level of 350° C. is reached and maintained for 12 hours.

After sulphuration, the temperature is decreased to 330° C. and the test feedstock is injected (without DMDS). The catalytic test is carried out at a total pressure of 3 MPa, with lost hydrogen (without recycling), at HVR=2 h$^{-1}$, with a volume ratio H$_2$/HC at the inlet of 250 Std l/l (flow H$_2$=24 Std l·h$^{-1}$, feedstock flow=60 cm$^3$·h$^{-1}$) and at three different temperatures, 330° C. then 340° C. and 350° C., allowing between each point sufficient time for the sulphur content to be stabilised.

In order to be able to evaluate the performance levels of the catalysts in terms of HDS and to be able to avoid the presence of H$_2$S in the effluents, the pot containing the effluents is stripped using nitrogen at a ratio of 10 L·h$^{-1}$.

The gas oil used here is from a raw Arab heavy. It contains 0.89% by weight of sulphur, 150 ppm by weight of nitrogen, a density of 0.848 g/cm$^3$ and a weighted mean temperature (TMP), defined on the basis of the temperature at which 5%, 50% and 70% of the volume of the feedstock according to the following formula are distilled: TMP=(T$_5$+2T$_{50}$+4T$_{95}$)/7, is 324° C.

The catalytic performance levels of the catalysts are set out in Table 6. They are expressed in terms of relative activity, assuming that the activity of the catalyst C1 is equal to 100 and considering that they are in the apparent order of 1.25 in relation to the sulphur (a mean activity calculated at the three temperature points is indicated). Another method of quantifying the increase is to take the temperature for which the effluent contains 50 ppm of sulphur. In the same manner, the catalyst C1 is placed as a base.

TABLE 6

Relative activity (at iso-volume of catalyst) in terms of HDS of direct distillation gas oil of the catalysts C1 to C4

| Catalyst | | | | Relative $A_{hds}$ in relation to C1 (%) | $T_{50\,ppm}$* |
|---|---|---|---|---|---|
| C1 (non-conforming) | 20% $MoO_3$ | Z = 2.4 | AL-1 | 100 | Base |
| C3 (conforming) | 20% $MoO_3$ | Z = 6.4 | AL-2 | 105 | Base - 2.3° C. |
| C2 (non-conforming) | 25% $MoO_3$ | Z = 2.3 | AL-1 | 117 | Base - 5.1° C. |
| C4 (conforming) | 25% $MoO_3$ | Z = 6.1 | AL-3 | 127 | Base - 6.9° C. |

*a lower temperature indicates an increase in activity

The results appearing in Table 6 demonstrate the great increase in activity obtained on the catalyst C3 prepared according to the process of the invention by impregnating a support having a high parameter Z (6.4) in relation to the catalyst C1 prepared with a support whose parameter Z is low (2.4).

The effect is confirmed with a higher content of metals (catalyst C2 according to a process of the prior art in relation to the catalyst C4 prepared according to the invention).

In a more general manner, the results obtained demonstrate that the catalyst prepared according to the invention allows a reduction by approximately 2° C. in the operating temperature of the unit for the same sulphur content in the effluent in relation to the catalysts of the prior art. That increase may also allow the refiner to process feedstocks which would be more refractory and which would not be compatible with the operating temperatures required by the catalysts of the prior art, but which become compatible if the catalysts according to the invention are used.

The invention claimed is:

1. A hydroprocessing process comprising contacting with at least one catalyst at least one gas oil cut having a weighted mean temperature (TMP) between 240° C. and 350° C., at a temperature between 250° C. and 400° C., at a total pressure between 2 MPa and 10 MPa with a ratio of volume of hydrogen to volume of hydrocarbon-containing feedstock between 100 and 800 litres per litre and at an Hourly Volume Rate (HVR) which is defined by the ratio of the volume flow rate of liquid hydrocarbon-containing feedstock to volume of catalyst fed into the reactor between 1 and 10 h$^{-1}$, wherein the at least one catalyst comprises at least one metal of group VIB and/or at least one metal of group VIII of the periodic classification and a support comprising an amorphous mesoporous alumina, the alumina being prepared according to a process comprising at least:

a) at least one first precipitation a) of alumina, in an aqueous reaction medium, from at least one basic precursor that is sodium aluminate, potassium aluminate, ammonia, sodium hydroxide or potassium hydroxide and at least one acid precursor that is aluminium sulphate, aluminium chloride, aluminium nitrate, sulphuric acid, hydrochloric acid or nitric acid, wherein at least one of the basic or acid precursors comprises aluminium, the relative flow rate of the acid and basic precursors is selected so as to obtain a pH of the reaction medium between 8.5 and 10.5 and the flow rate of the acid and basic precursor(s) containing aluminium is adjusted so as to obtain a progress rate of the first step between 45 and 90%, the progress rate being defined as being the proportion of alumina formed as $Al_2O_3$ equivalent during the first precipitation a) in relation to the total quantity of alumina formed at the end of the precipitation, a) the first precipitation a) operating at a temperature between 20 and 40° C., and for a time between 2 minutes and 30 minutes, heat treatment of a suspension obtained at the end of a) and in between a) and a'), at a temperature between 20 and 90° C. for a time between 7 minutes and 45 minutes a') a second precipitation of the heat treated suspension the second precipitation being carried out by adding to the heat treated suspension at least one basic precursor that is sodium aluminate, potassium aluminate, ammonia, sodium hydroxide and potassium hydroxide and at least one acidic precursor that is aluminium sulphate, aluminium chloride, aluminium nitrate, sulphuric acid, hydrochloric acid, or nitric acid, in which at least one of the basic or acidic precursors contains aluminium, the relative flow rate of the acidic and basic precursors is chosen so as to obtain a pH of the reaction medium between 8.5 and 10.5 and the flow rate of the acidic and basic precursor or precursors containing aluminium is regulated so as to obtain a rate of progress of the second step between 10 and 55%, the rate of progress being defined as the proportion of alumina formed as $Al_2O_3$ equivalent during the said second precipitation step with respect to the total amount of alumina formed at the end of the precipitation a'), the precipitation being carried out at a temperature between 40 and 90° C., and for a period between 2 minutes and 50 minutes, a second heating step of a suspension obtained at the end of the second precipitation at a temperature between 50 and 95° C., b) thermal processing of the suspension obtained at the end of the step a'), at a temperature between 50 and 200° C. for a period between 30 minutes and 5 hours, allowing an alumina gel to be obtained, c) filtering of the suspension obtained at the end of the thermal processing b), followed by at least one washing of the gel obtained, d) drying of the alumina gel obtained at the end of c) in order to obtain a powder, e) shaping of the powder obtained at the end of d) in order to obtain raw material, f) thermal processing of the raw material obtained at the end of e) at a temperature between 500 and 1000° C., with or without an air flow containing up to 60% by volume of water.

2. The process according to claim 1, wherein the gas oil cut used is a gas oil cut from direct distillation alone or in admixture with at least one cut from a coking unit, or at least one cut from the catalytic cracking or at least one gas oil cut from mild hydrocracking or hydroprocessing of residues.

3. The process according to claim 1, wherein the elements of group VIII are cobalt or nickel, alone or in admixture.

4. The process according to claim 1, wherein the elements of group VIB are tungsten or molybdenum, alone or in admixture.

5. The process according to claim 1, wherein the catalyst comprises at least one metal of group VIB in combination with at least one non-noble metal of the group VIII, the content of metal of the group VIB is between 10 and 35% by weight of oxide in relation to the total mass of the catalyst, and the content of non-noble metal of the group VIII is between 1 and 10% by weight of oxide in relation to the total mass of the catalyst.

6. The process according to claim 1, wherein the catalyst contains at least one doping element that is phosphorus, boron, fluorine or silicon, alone or in admixture.

7. The process according to claim 6, wherein the content of phosphorus in the catalyst is between 0.5 and 15% by weight of $P_2O_5$.

8. The process according to claim 1, wherein the support of the catalyst comprises an amorphous mesoporous alumina having a connectivity (Z) between 3 and 7.

9. The process according to claim 1, wherein the catalyst has a connectivity (Z) between 3 and 7.

10. The process according to claim 1, wherein the support of the catalyst has the following porous distribution, measured by mercury porosimetry:
- the volume percentage contained in the pores having a size between 2 and 6 nm, in relation to the total porous volume, is between 1 and 25%,
- the volume percentage contained in the pores having sizes greater than 6 nm and less than 15 nm constitutes between 60 and 95% of the total porous volume,
- the volume percentage contained in the pores having a size between 15 and 50 nm constitutes from 0 to 8% of the total porous volume and
- the volume percentage contained in the pores having a size between 50 and 7000 nm which corresponds to the macroporous volume constitutes from 0 to 5%.

11. The process according to claim 1, wherein the support has a median diameter of the mesopores measured by mercury porosimetry established by volume between 7 and 12.5 nm.

12. The process according to claim 1, wherein the support has a volume of the mesopores measured by mercury porosimetry between 0.5 and 0.8 ml/g.

13. The process according to claim 1, wherein the catalyst has the following porous distribution established by mercury porosimetry:
- the volume percentage contained in the pores having a size between 2 and 6 nm, in relation to the total porous volume is between 1 and 25%,
- the volume percentage contained in the pores having sizes greater than 6 nm and less than 15 nm constitutes between 60 and 95% of the total porous volume,
- the volume percentage contained in the pores having a size between 15 and 50 nm constitutes from 0 to 15% of the total porous volume and
- the volume percentage contained in the pores having a size between 50 and 7000 nm which corresponds to the macroporous volume constitutes from 0 to 5% of the total porous volume.

14. The process according to claim 1, wherein the catalyst has a total porous volume measured by mercury porosimetry greater than or equal to 0.35 ml/g.

* * * * *